United States Patent
Caldwell

(10) Patent No.: US 9,695,548 B2
(45) Date of Patent: Jul. 4, 2017

(54) METHODS EMPLOYING RAISED TRANSFERS FOR EMBROIDERED-STYLE PRODUCTS

(71) Applicant: Christopher T. Caldwell, Lenoir, NC (US)

(72) Inventor: Christopher T. Caldwell, Lenoir, NC (US)

(73) Assignee: AVERY DENNISON RETAIL INFORMATION SERVICES, LLC, Westborough, MA (US)

( * ) Notice: Subject to any disclaimer, the term of this patent is extended or adjusted under 35 U.S.C. 154(b) by 0 days.

(21) Appl. No.: 14/316,339

(22) Filed: Jun. 26, 2014

(65) Prior Publication Data

US 2016/0076197 A1    Mar. 17, 2016

Related U.S. Application Data

(60) Provisional application No. 61/839,584, filed on Jun. 26, 2013.

(51) Int. Cl.
*B29C 65/02* (2006.01)
*B29C 65/54* (2006.01)
(Continued)

(52) U.S. Cl.
CPC .......... *D06Q 1/005* (2013.01); *A41D 27/08* (2013.01); *A43B 3/0078* (2013.01); *B32B 3/04* (2013.01);
(Continued)

(58) Field of Classification Search
USPC .......... 156/247, 249, 289, 308.2, 308.4, 323
See application file for complete search history.

(56) References Cited

U.S. PATENT DOCUMENTS 3,802,947 A * 4/1974 McQuade, Jr. ......... B44C 3/085
                                                                          156/220
4,461,800 A * 7/1984 Tanaka .................. B30B 15/061
                                                                          100/295

(Continued)

FOREIGN PATENT DOCUMENTS

DE           1068459        12/1970
DE           1909334        12/1970
WO    WO 2007103168 A2 *  9/2007 ............. A41D 27/08

OTHER PUBLICATIONS

International Search Report and Written Opinion dated Mar. 15, 2015 for International Application No. PCT/US2014/044415 filed Jun. 26, 2014.

*Primary Examiner* — Sing P Chan
(74) *Attorney, Agent, or Firm* — Avery Dennison Retail Information Services, LLC

(57) ABSTRACT

A method of manufacturing a soft-goods product includes substantially permanently affixing a transfer having projecting embellishments in an embroidered style without the use of sewing. The transfer employs an adhesive and pressure application to achieve the substantially permanent attachment. The adhesive includes pressure-sensitive, acrylic and hot-melt adhesives, as well as adhesives having one or more combinations of these features. Pressure is applied in a transverse manner and can be supplemented by an insert having compressibility properties and when desired, supplemented by the application of heat energy.

18 Claims, 10 Drawing Sheets

(51) Int. Cl.

| | | |
|---|---|---|
| B32B 37/06 | (2006.01) |
| B32B 37/10 | (2006.01) |
| B32B 37/12 | (2006.01) |
| B32B 37/26 | (2006.01) |
| B32B 38/10 | (2006.01) |
| B32B 43/00 | (2006.01) |
| B65C 9/25 | (2006.01) |
| C09J 5/06 | (2006.01) |
| D06Q 1/00 | (2006.01) |
| D06Q 1/12 | (2006.01) |
| A41D 27/08 | (2006.01) |
| A43B 3/00 | (2006.01) |
| C09J 5/00 | (2006.01) |
| C09J 7/02 | (2006.01) |
| B32B 5/02 | (2006.01) |
| B32B 5/18 | (2006.01) |
| B32B 7/12 | (2006.01) |
| B32B 5/14 | (2006.01) |
| B32B 5/24 | (2006.01) |
| B32B 3/04 | (2006.01) |
| B32B 3/26 | (2006.01) |
| A42C 5/00 | (2006.01) |

(52) U.S. Cl.
CPC ............... *B32B 3/26* (2013.01); *B32B 5/024* (2013.01); *B32B 5/147* (2013.01); *B32B 5/18* (2013.01); *B32B 5/245* (2013.01); *B32B 7/12* (2013.01); *C09J 5/00* (2013.01); *C09J 7/0296* (2013.01); *D06Q 1/12* (2013.01); *A42C 5/00* (2013.01); *B32B 2307/75* (2013.01); *B32B 2437/00* (2013.01); *C09J 2201/606* (2013.01); *C09J 2400/263* (2013.01); *C09J 2433/00* (2013.01)

(56) References Cited

U.S. PATENT DOCUMENTS

| | | | |
|---|---|---|---|
| 5,653,166 A | | 8/1997 | Mohammed et al. |
| 5,716,687 A | * | 2/1998 | Chumbley ............... C09J 7/00 428/134 |
| 5,769,999 A | * | 6/1998 | Anderson ............... B29C 65/18 100/319 |
| 7,767,600 B1 | | 8/2010 | Figueroa |
| 8,398,804 B2 | * | 3/2013 | Baqai ........................ B32B 5/02 156/249 |
| 2002/0015829 A1 | | 2/2002 | Kim |

* cited by examiner

METHODS EMPLOYING RAISED TRANSFERS FOR EMBROIDERED-STYLE PRODUCTS

CROSS-REFERENCE TO RELATED APPLICATION(S)

The present application claims priority from U.S. Provisional Application No. 61/839,584 filed Jun. 26, 2013 which is incorporated by herein by reference in its entirety.

BACKGROUND

Field of the Disclosure

The present subject matter relates to methods for embellished products employing a transfer having a raised embellishment area projecting beyond a base layer. The present subject matter is especially suitable in manufacturing soft good products having printed, woven, textured, or embroidery-appearing or looking embellishments and/or panels. In accordance with the embodiments of the present subject matter, attachment of the transfer is carried out in the absence of sewing, and energy-intensive bonding equipment use is minimized or eliminated in many applications.

Description of Related Art

Transfer labels, patches, tags, identification placards, embellishments and the like are widely used for a variety of different applications including logos, trademarks, keyboard symbol identifiers, whether numeric, alphabetic, alphanumeric or other symbols, governmental agency patches, artwork and the like. In some applications, these symbols are printed, woven, textured or embroidery style having a raised area or multiple raised areas that provide a three-dimensional quality or appearance characteristic. Often these types of embellishments or identifiers are sewn in place onto a garment or the like or are attached by way of sonic welding or with thermal bonding equipment.

These types of embellishments and/or identifiers can advantageously be applied to so-called soft goods, at times with one or more objectives such as appearance upgrade, enhanced appearance clarity, official-looking quality, higher-end luxury, and combinations thereof. The term "soft goods" is generally understood in the art. Examples include apparel items, such as, clothing, upper bodywear, lower bodywear, headwear, footwear, outerwear, underwear, garments, sheet goods, banners, flags, athletic or sport uniforms, government uniforms, organization uniforms, and combinations thereof and accessories therefor.

In an example, embellishments can be in the form of digital printed appliqué emblems. Same can exhibit superior durability characteristics due to enhanced wash-fast properties and the ability to be ironed. Heat or pressure transfer capability can be included. Subject matter of that type is found in International Publication No. WO 2007/103168, incorporated herein by reference in its entirety.

Another example concerns pressure-sensitive textile adhesives used in wash-durably bonding integrated textile emblems such as patches, labels and cut textile parts to another textile article by laminating a pressure-sensitive adhesive ("PSA") such as an acrylic polymer adhesive to the back surface of the textile emblem or the like. These types of PSA adhesives are not water soluble and can be applied in adequate thickness to provide a wash-durable textile-to-textile bond. Illustrations are found for example in U.S. Pat. No. 8,398,804, incorporated herein by reference in its entirety.

Examples of pressure-sensitive adhesives are found in European Patent Application Publication No. 629639, incorporated herein by reference in its entirety. This illustrates self-crosslinking solvent-borne PSA type adhesives.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as may be set forth in the claims appended hereto.

In one aspect of this disclosure, a method is followed for manufacturing a soft-goods product that includes adding an embellishment that is printed, textured, woven, or embroidered to soft-goods items by preparing a transfer having a base layer and a raised panel such as an embellishment layer or layers which projects beyond the upper surface of the base layer. An adhesive is applied onto the lower surface of the base layer. A liner layer is positioned over the adhesive for protection of the adhesive during handling and storage until assembly is desired. With the liner removed, the transfer is positioned at the desired location on a soft-goods item. During manufacture, an insert having compressibility properties is located at least over the entirety of the embellishment or panel of the transfer while the adhesive layer engages the desired location on the soft-goods item, and pressure is applied whereby the soft goods product is produced.

In another aspect, a soft-goods product is provided that is made according to the method for manufacturing a soft-goods product that includes adding an embellishment to a soft-goods items by preparing a transfer having a base layer and a raised panel or embellishment layer or layers which projects beyond the upper surface of the base layer. An adhesive is applied onto the lower surface of the base layer. A liner layer is positioned over the adhesive for protection of the adhesive during handling and storage until assembly is desired. With the liner removed, the transfer is positioned at the desired location position on a soft-goods item. During manufacture, an insert having compressibility properties is located over at least the entirety of the embellishment or panel of the transfer while the adhesive layer engages the desired location on the soft-goods item, and pressure is applied whereby the soft goods product is produced.

In a further aspect, a method is followed for manufacturing a soft-goods product that includes adding an embellishment to soft-goods items by preparing a transfer having a base layer and a raised panel or embellishment layer or layers which projects beyond the upper surface of the base layer. An adhesive is applied onto the lower surface of the base layer. A liner layer is positioned over the adhesive for protection of the adhesive during handling and storage until assembly is desired. With the liner removed, the transfer is positioned at the desired location position on a soft-goods item. During manufacture, an insert having compressibility properties is located over at least the entirety of the embellishment or panel of the transfer while the adhesive layer engages the desired location on the soft-goods item, and pressure is applied whereby the soft goods product is produced. The adhesive is a pressure-sensitive adhesive, the transfer with its raised printed, woven, textured, or embroidered embellishment layer is substantially permanently secured at the desired location, and the height of the raised portions of the transfer is substantially maintained in the finished product.

In yet another aspect of this disclosure, a soft-goods product is provided that is made according to the method for manufacturing a soft-goods product that includes adding an embellishment to a soft-goods items by preparing a transfer having a base layer and a raised panel or embellishment layer or layers which projects beyond the upper surface of the base layer. An adhesive is applied onto the lower surface of the base layer. A liner layer is positioned over the adhesive for protection of the adhesive during handling and storage until assembly is desired. With the liner removed, the transfer is positioned at the desired location position on a soft-goods item. During product manufacture, an insert having compressibility properties is located over the entirety over the embellishment or panel of the transfer while the adhesive layer engages the desired location on the soft-goods item, and pressure is applied whereby the soft goods product is produced. The raised embellishment or panel of the finished product retains its predetermined height or amount of projection present prior to affixing same to the soft-goods item. The insert is substantially deformable throughout or has an outside section having a deformable depth that accommodates the raised embellishment or panel layer, the deformability allowing the avoidance of any significant reduction of the predetermined height of the raised embellishment or panel layer of the transfer.

In a further aspect of the disclosure, a soft-goods product is provided that is made according to the method for manufacturing a soft-goods product that includes adding in embellishment to a soft-goods item by preparing a transfer having a base layer and a raised panel or embellishment layer (or layers) which projects (or project) beyond the upper surface of the base layer. An adhesive is applied onto the lower surface of the base layer. A liner layer is positioned over the adhesive for protection of the adhesive during handling and storage until assembly is desired. With the liner removed, the transfer is positioned at the desired location position on a soft-goods item, and an insert having compressibility properties is located over the entirety of at least the embellishment or panel of the transfer while the adhesive layer engages the desired location on the soft-goods item, and pressure is applied whereby the soft goods product is produced. During such manufacture, the insert with its deformable characteristic nevertheless applies a compressive force to all areas of the transfer, applying substantially equal pressure throughout at least the exterior surface of the raised embellishment or panel.

In a further aspect of this disclosure, a method is followed for manufacturing a soft-goods product that includes adding an embellishment to soft-goods items by preparing a transfer having a base layer and a raised panel or embellishment layer or layers which projects beyond the upper surface of the base layer. An adhesive having pressure-sensitive adhesion attributes is applied onto the lower surface of the base layer. A liner layer is positioned over the adhesive for protection of the adhesive during handling and storage until assembly is desired. With the liner removed, the transfer is positioned at the desired location on a soft-goods item. While the adhesive layer engages the desired location on the soft-goods item, pressure is applied whereby the soft goods product is produced.

In an additional aspect, the disclosure relates to a transfer for application to a soft goods item, the transfer including a base layer having an upper surface and a lower surface, a raised embellishment or panel layer projecting above the upper surface of the base layer, a pressure-sensitive adhesive layer on the lower surface of the base layer, and a liner layer covering the pressure-sensitive adhesive layer.

DESCRIPTION OF THE ILLUSTRATED EMBODIMENTS

As required, detailed embodiments of the present invention are disclosed herein; however, it is to be understood that the disclosed embodiments are merely exemplary of the invention, which may be embodied in various forms. Therefore, specific details disclosed herein are not to be interpreted as limiting, but merely as a basis for the claims and as a representative basis for teaching one skilled in the art to variously employ the present invention in virtually any appropriate manner.

Figure 1:
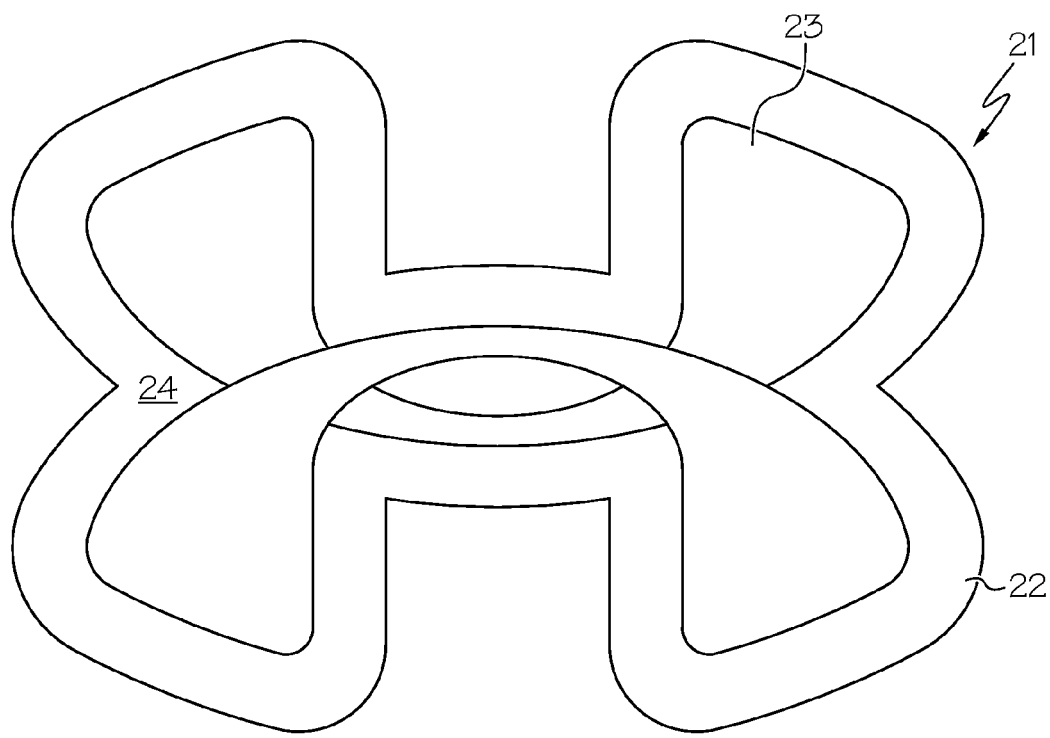
FIG. 1 is a plan view of an embodiment of a transfer in the form of a logo suitable for the present subject matter.
Figure 2:
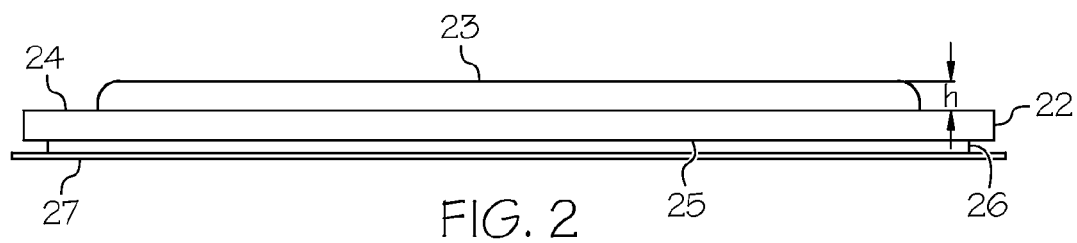
FIG. 2 is an elevational view of the embodiment of FIG. 1.

An embodiment of an insert of the present disclosure for illustrating a transfer suitable for use in the method and product of the disclosure is illustrated in FIG. 1 and FIG. 2. The transfer, generally designated as 21, includes a base layer 22 and a raised layer 23 projecting above an upper surface 24 of the base layer 22. A lower surface 25 of the base layer has an adhesive layer 26 applied to it. A liner 27 typically is positioned over the adhesive layer 7 so as to provide protection and retard loss of properties of the adhesive layer between the times of transfer manufacture and transfer application and attachment.

As seen in the drawings, particularly FIG. 2, the raised layer 23 projects above the base layer 22. The extent of this projection is a predetermined amount, referred to herein as the height "h" as illustrated in FIG. 2. This transfer 21 can be referred to as being of a printed, woven, textured or embroidery-type embellishment, due to the presence of raised layer features that are schematically illustrated in FIG. 2.

Figure 3:
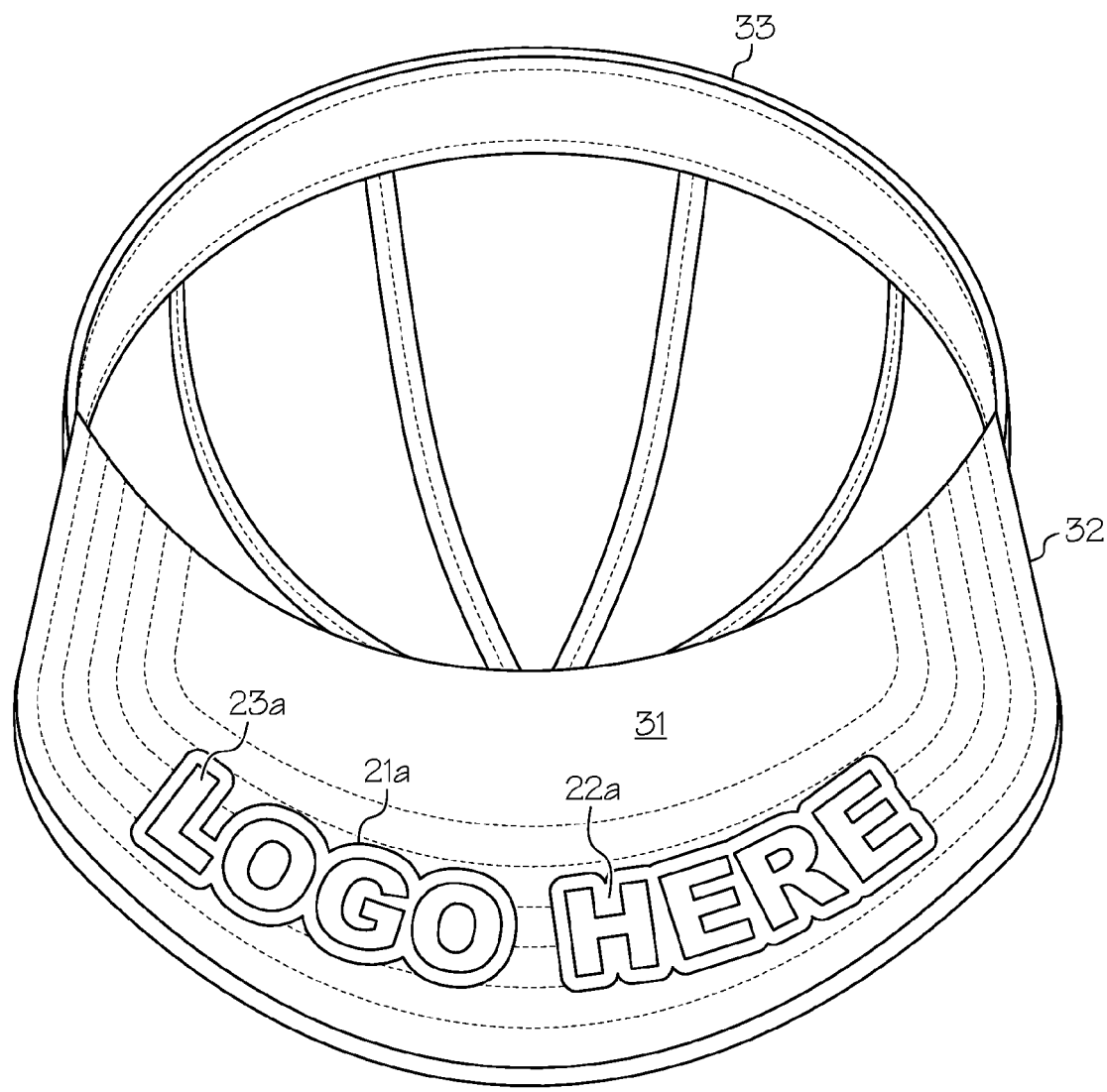
FIG. 3 is a perspective view illustrating positioning of a transfer onto the under-brim of a baseball-style cap illustrating operation according to the present disclosure.

The transfer 21a having alphabetic indicia rather than a logo appearance (as illustrated in FIG. 1) is seen in FIG. 3 during the process of positioning the transfer 21a on the bottom or inside surface 31 of a bill 32 of a baseball-style cap 33. A base layer 22a and a raised indicia layer 23a are illustrated. The baseball-style cap is considered to be a soft-goods item of the type that can benefit from the features and advantages of the present disclosure. When the transfer is substantially permanently secured to the soft goods, the result is a soft-goods product according to the disclosure.

Figure 4:
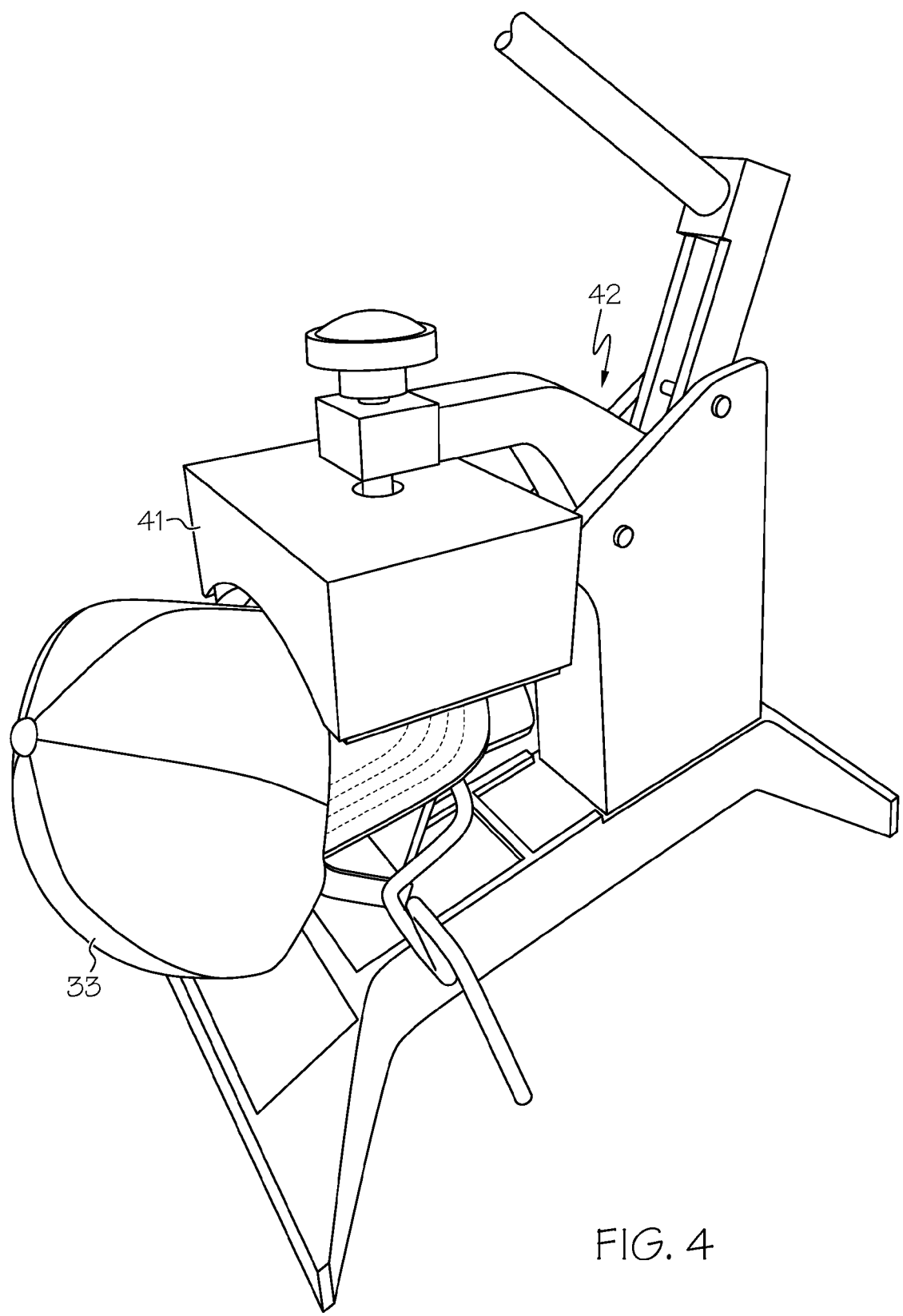
FIG. 4 is a perspective view of the cap of FIG. 3 positioned within a press.

The thus-positioned transfer 21a and cap 33 are positioned between an upper jaw 41 and a lower jaw (not shown) of a press machine, generally designated as 42. Prior to the positioning shown in FIG. 3, any provided liner has been removed from the transfer, and the adhesive layer 26 is in complete engagement with the inside surface 31 of the cap bill. With the alignment shown in FIG. 4, the press machine 42 applies pressure to the cap bill and the transfer and thus to the adhesive. When desired, this operation can be accompanied by the application of heat. The adhesive layer formulation is advantageously responsive to the application of pressure by a press machine such as that illustrated, and same can be especially advantageous for heat-activated adhesives when the pressure application is supplemented by heat, same being most conveniently supplied by the machine itself.

With further reference to the adhesive layer, a so-called permanent pressure sensitive adhesive such as an acrylic or hot melt adhesive is preferred. Some adhesives of this permanent pressure-sensitive type perform best when subjected to heat as well as pressure. In an embodiment, the disclosure is of a peel-and-stick type and can be characterized as being of a cold fixation type, wherein the transfer is substantially permanently attached without the need of heat-activated adhesive application or sewing. In an embodiment, embellishment of soft goods such as headwear is achieved with a transfer having a pressure-sensitive adhesive and without requiring bonding equipment. A pressure-sensitive textile adhesive is described in U.S. Pat. No. 8,398,804, referenced hereinabove and incorporated herein by reference in its entirety.

Figure 5:
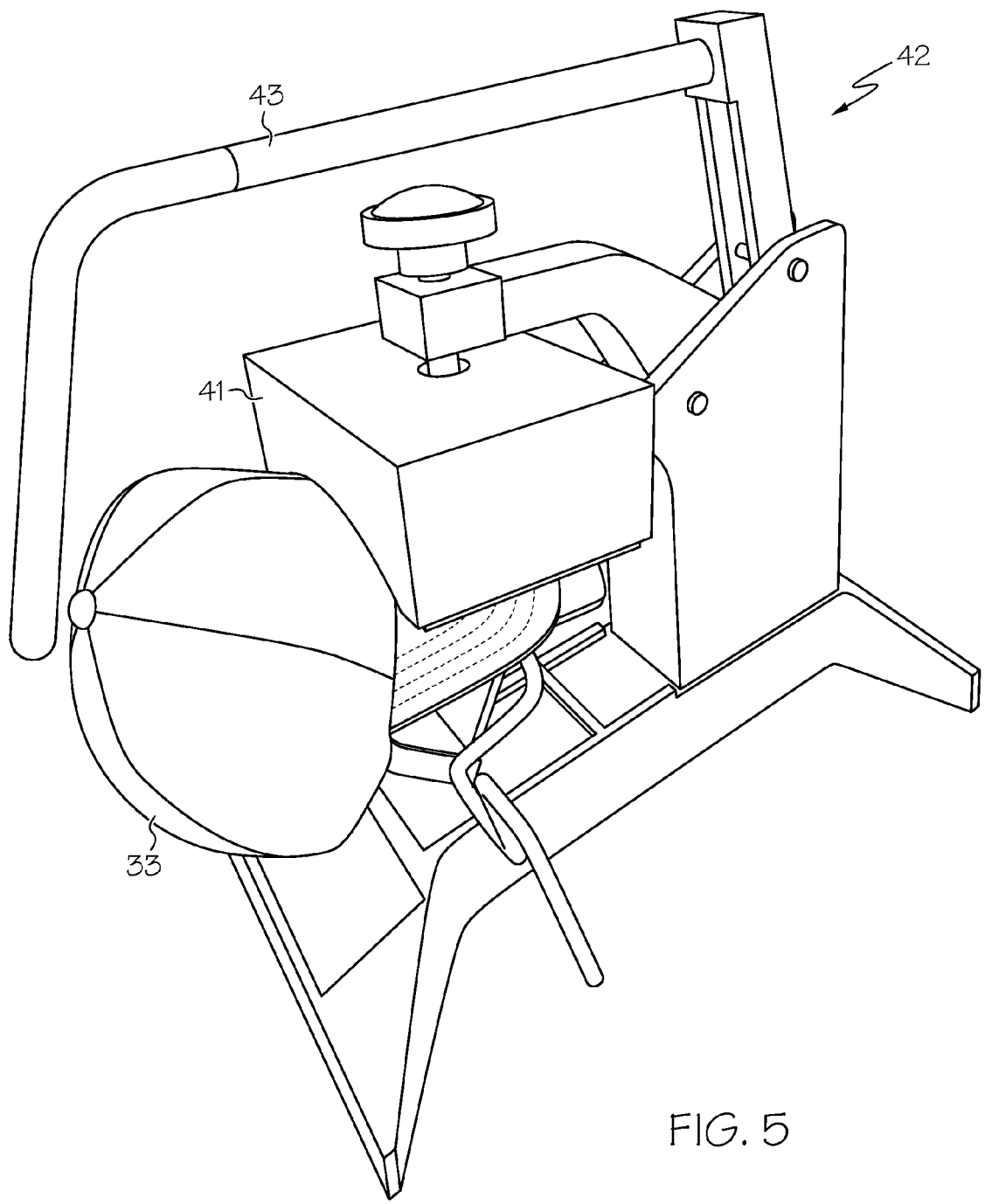
FIG. 5 is a perspective view generally in accordance with FIG. 4 and illustrating applying transverse pressure for securing the transfer to the underbill of the cap.

FIG. 5 illustrates applying pressure to a transfer according to an embodiment of the present subject matter. A handle 43 of the machine has been depressed in this view while the various components are secured in proper position.

Figure 6:
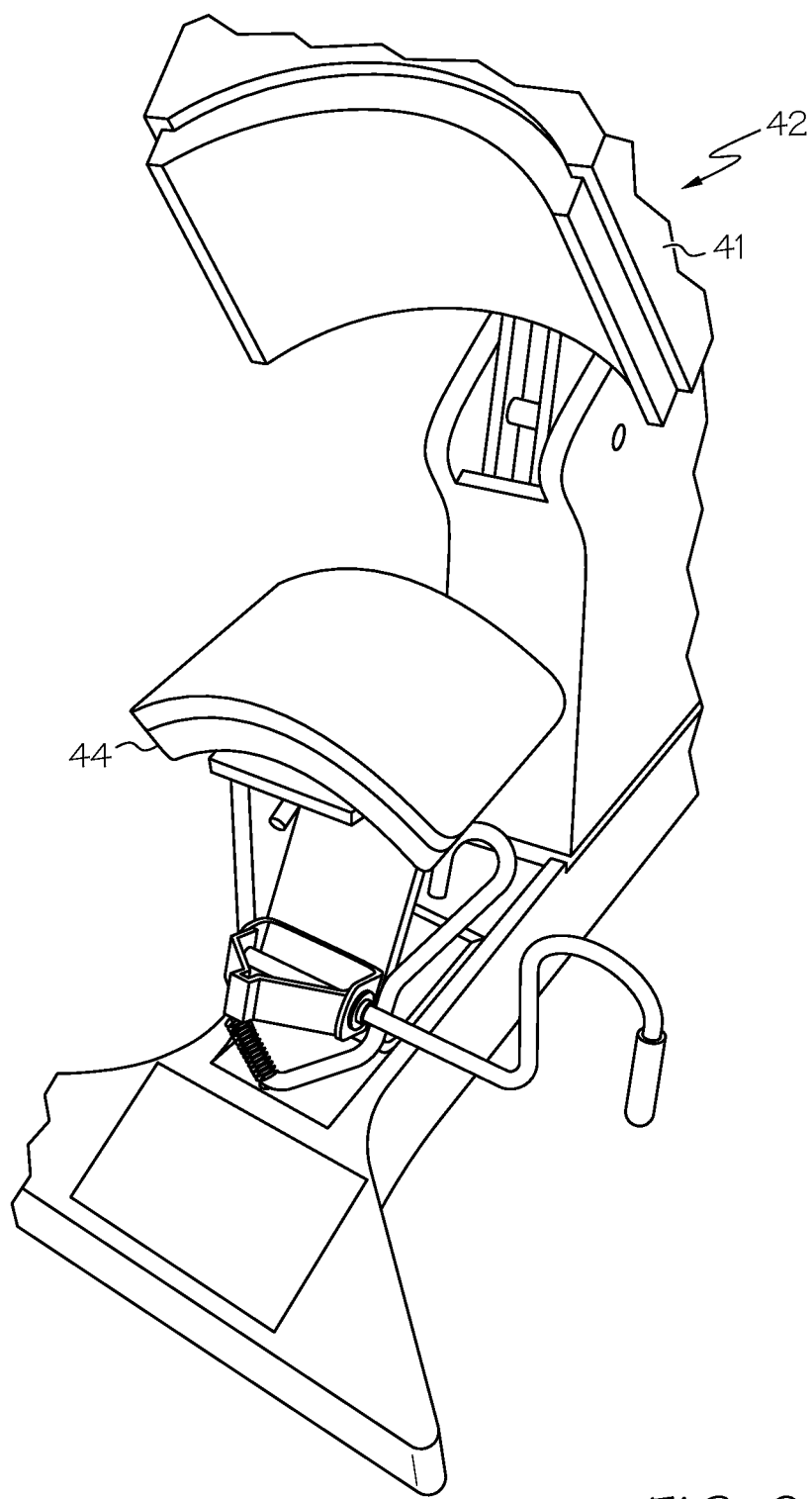
FIG. 6 is a partial perspective view of a heat-press machine in a fully open condition.

In FIG. 6, the press machine 42 is shown with its upper jaw 41 fully open. In this view, lower jaw 44 can be seen, which can be modular so as to provide one of various forms depending upon the shape of the soft-goods item or other functional or operational details attended to for operation according to any particular embodiment.

Figure 7:
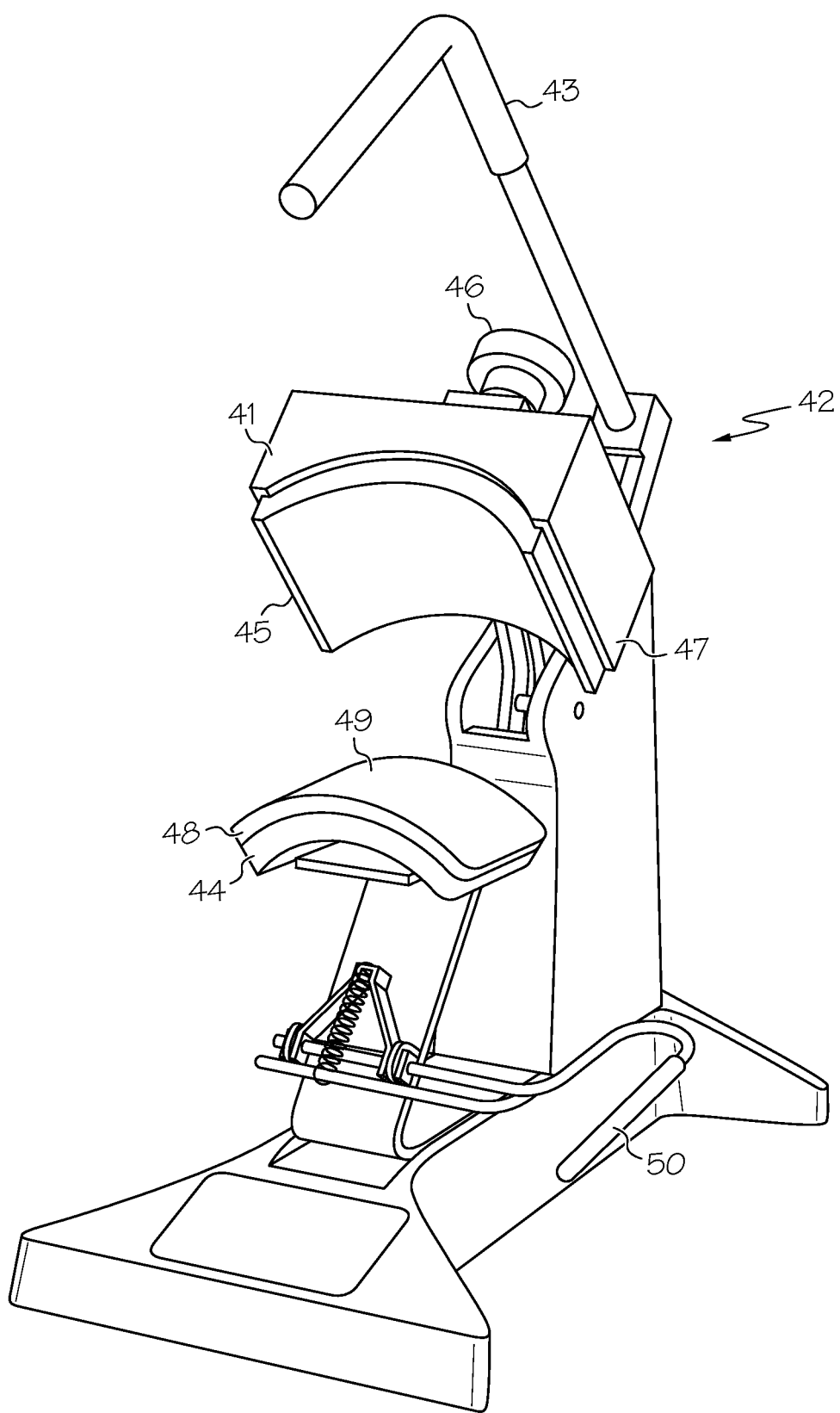
FIG. 7 is a perspective view of the heat-press machine of FIG. 6 illustrating further details thereof.

The specific press machine 42 shown in FIG. 6 is a Model 418 heat press machine of InstaGraphic Systems of Cerritos, Calif. In this machine, the upper jaw 41 includes a cast heating element 45 which, together with electrical and hardware components of this machine, transmit heat from element 45 onto the soft goods, which can include thermal conduction through a thickness of the soft good itself to enhance reception of the adhesive by the soft good, as well as conductance of heat energy to the adhesive itself when same has hot-melt properties that can assist in the substantially permanent bonding achieved according to the present disclosure. A central pressure source is generally illustrated at 46. Upper jaw 41 includes a curved platen 47. The particularly illustrated lower jaw 44 also includes a curved platen 48 having a cast curved plate 49. In some embodiments, platen 48 can be interchangeable with platens offering shapes different from the particular curve shown in FIG. 7. A cap hold-down mechanism 50 also is shown.

Figure 8:
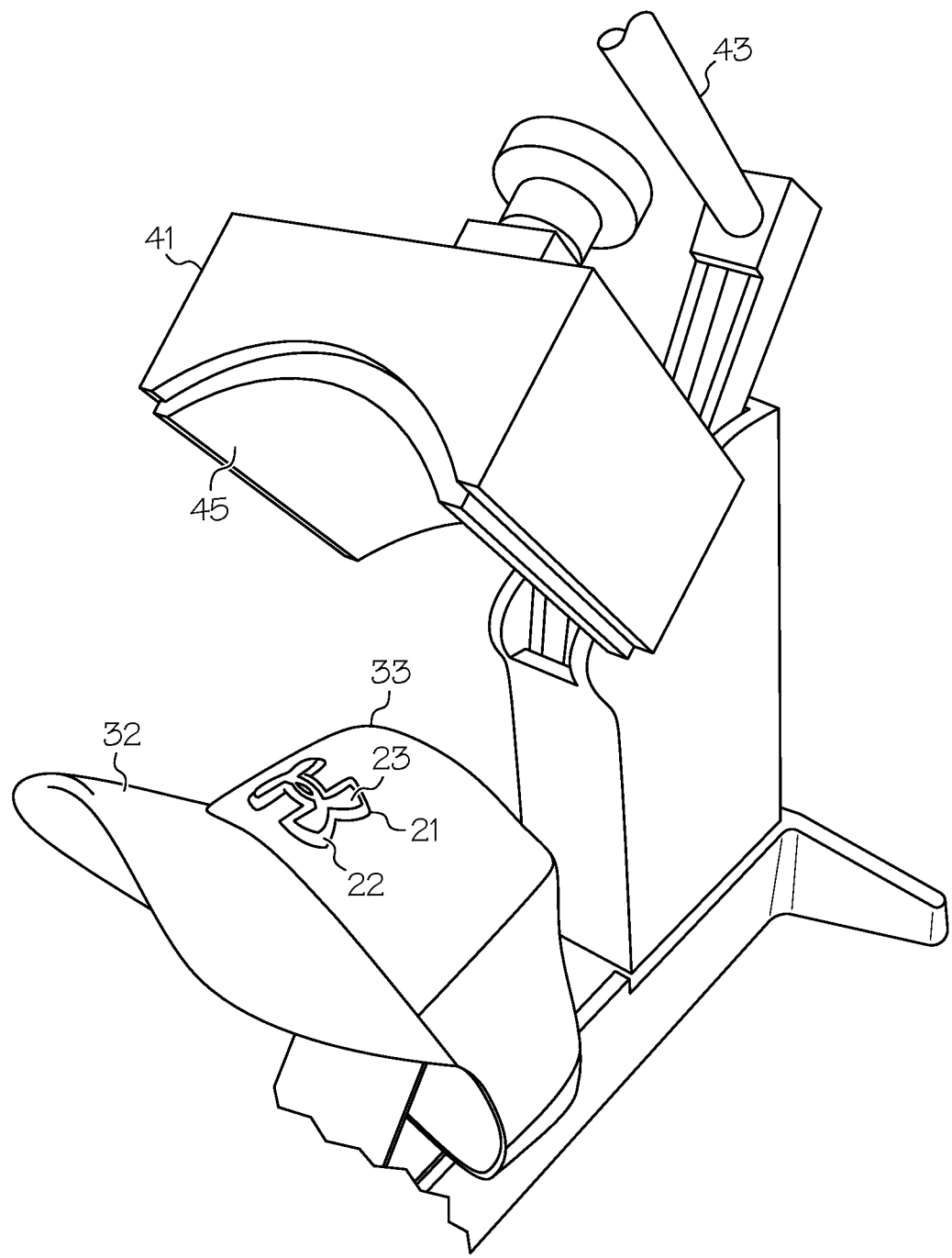
FIG. 8 is a perspective view showing positioning of a transfer onto the front of a baseball-style cap during an operation according to the present disclosure.

FIG. 8 shows an embodiment wherein the transfer 21 is positioned on the outside front or crown of the cap 33. Here, the inside of the cap crown front rests on the lower jaw of the machine. In this illustration, the transfer is lined up for pressure application between the jaws of the machine.

Figure 9:
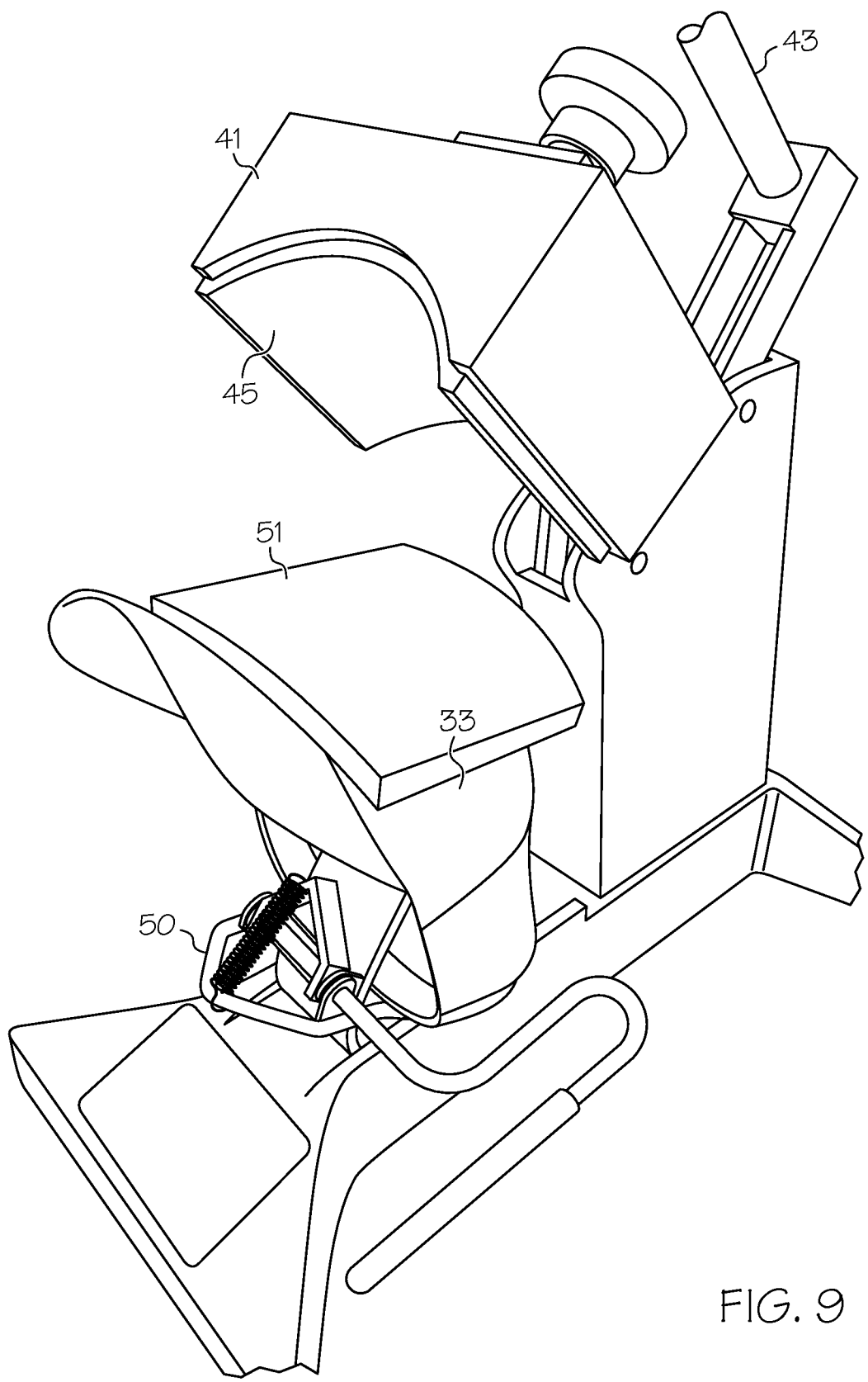
FIG. 9 is a perspective view illustrating the procedure of placing an insert having compressible properties while operating according to the present disclosure.

In the embodiment shown in FIG. 9, an insert 51 having compressible properties is positioned so as to fully cover the transfer 21. In this illustrated embodiment, the insert 51 is positioned between the transfer and the upper jaw 41. When desired, the upper jaw 41 can include the illustrated heating element 45 which can be activated when desired for a particular combination of soft goods material and properties and adhesive layer properties and susceptibility to the application of heat to the soft goods and/or adhesive layer of the transfer.

Figure 10:
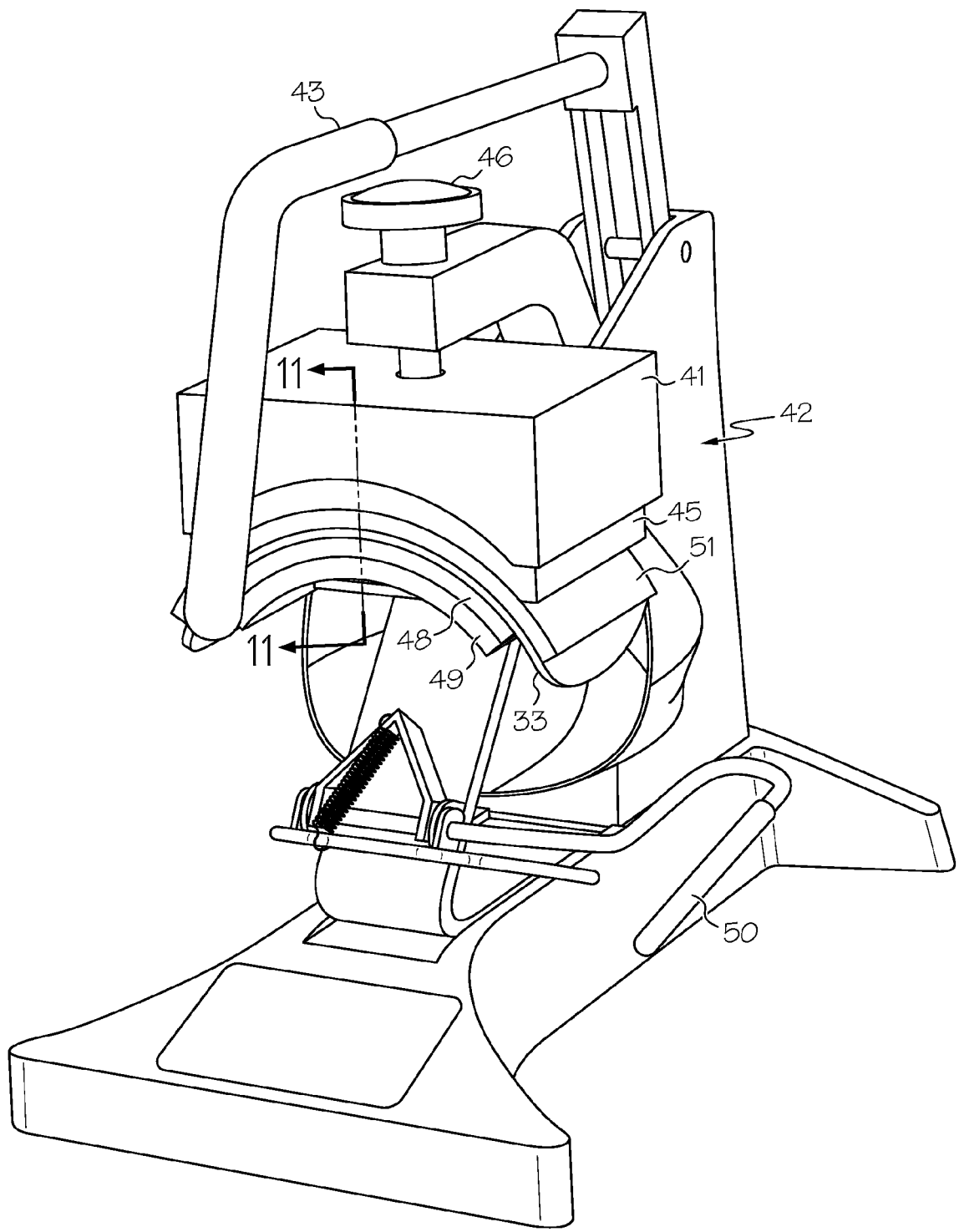
FIG. 10 is a perspective view illustrating a subsequent operation after that illustrated in FIG. 9.

After application of the closure handle 43, the cap (shown broken away in FIG. 10) is sandwiched between upper jaw 41 and lower jaw 44 and pressure is applied, as seen in FIG. 10.

Figure 11:
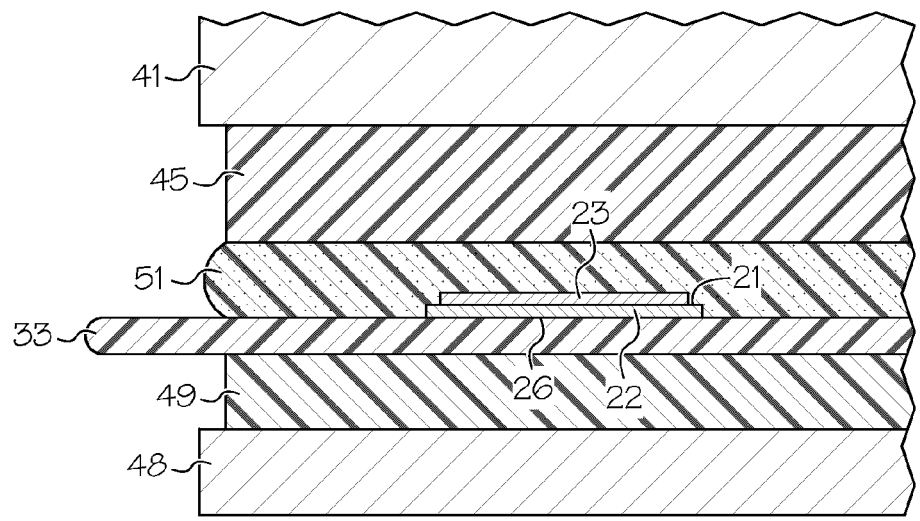
FIG. 11 is an enlarged cross-sectional view along the line 11-11 of FIG. 10.
Figure 12:
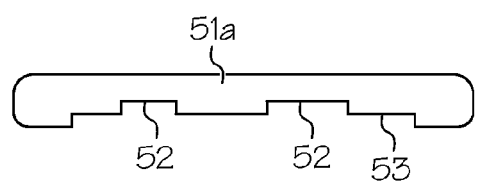
FIG. 12 is an elevation view of an insert embodiment.

The enlarged cross-sectional view of FIG. 11 illustrates a function of an embodiment of the insert 51. In this illustration, insert 51 can take the form of foam, typically a polymer. The compressible nature of the foam facilitates the application of pressure so that same is applied on the transfer and its adhesive layer 26 which has reduced in thickness as depicted in FIG. 11. The foam is used to help impart complete pressure on the transfer and its design. While foam is illustrated, any sort of compressible material can be provided in various embodiments. In FIG. 11, the insert of foam is generally consistent in compressible properties throughout and is uniform in thickness along the entire insert.

Figure 13:
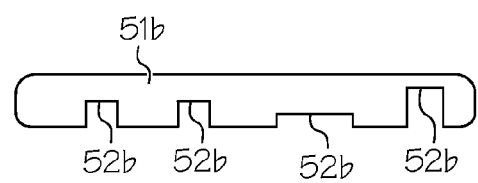
FIG. 13 is an elevation view of a further insert embodiment.
Figure 14:
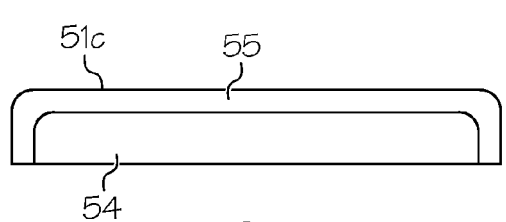
FIG. 14 is an elevation view of an additional insert embodiment.
Figure 15:
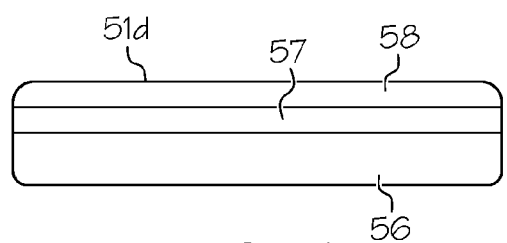
FIG. 15 is an elevation view of another insert embodiment.

Other embodiments of the insert are illustrated in FIG. 12, FIG. 13, FIG. 14 and FIG. 15 to provide other examples besides that shown in FIG. 11 of accommodating differing heights of the base layer and raised layer of the transfer. For example, the insert 51a of FIG. 12 has preformed indentations or indents or impressions. In this embodiment, indents 52 are sized, shaped and positioned to accommodate the raised layer of a particular transfer, while indents 53 accommodate the lesser extent of projection that is indicated by the base layer. Insert 51d that is illustrated in FIG. 13 includes a plurality of indents 52d that vary in depth and width and volume and that are preformed impressions in the insert that correspond to raised layer features and details in order to help in the equal application of pressure between the insert 51b and the soft goods item. Insert 51c that is depicted in FIG. 14 illustrates the situation where the insert has multiple sections that differ in compressibility. Thus, portion 54 has greater compressibility than portion 55, with the compressibility of portion 54 being adequate to accommodate the particular transfer and especially its raised layer details. Insert 51d of FIG. 15 itself has multiple layers that decrease in compressibility from layer portion 56 providing least resistance to layer portion 57 to layer portion 58 providing greatest resistance of the compressible portions.

With embodiments such as disclosed herein, the insert can provide desired levels of compressibility. For example, the insert can exhibit an outside section with a deformable depth that is at least about 5% greater than the raised embellishment layer predetermined amount, or between about 5 and 200%, or between about 5 and 100%, or between about 8 and 90%, or between about 9 and 80%, or between about 10 and 70%, or between about 10 and 60%, or between about 10 and 50% greater than the height of the raised embellishment layer.

Embodiments besides those illustrated herein also may be employed without departing from the scope of the present disclosure. For example, the transfer can include multiple raised layers of varying heights, as well as panels that may have geometric shapes that do not necessarily represent logos or trademarks, while the transfer can give the embossed appearance generally targeted in this disclosure within artwork or embellishments that are more complex and detailed than those specifically illustrated herein. Other means for applying pressure or for applying pressure and heat can be utilized rather than the machines illustrated herein.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

The invention claimed is:

1. A method of manufacturing a soft goods product, comprising:
   preparing a transfer by:
   (i) providing a base layer having an upper surface and a lower surface,
   (ii) providing a raised embellishment layer,
   (iii) assembling the raised embellishment layer onto the upper surface of the base layer whereby the raised embellishment layer projects above the base layer by a predetermined height,
   (iv) applying a layer of adhesive onto the lower surface of the base layer, and
   (v) overlaying a liner layer on the base layer lower surface so as to fully cover the adhesive layer;
   providing a soft goods item;
   peeling the liner layer away in order to expose the adhesive layer;
   positioning the transfer onto a desired location of the soft goods item while the adhesive layer is exposed;
   applying transverse pressure such that the predetermined height of the raised embellishment layer projection is substantially retained
   placing an insert having compressible properties over the entirety of the desired location of the soft goods item to form a pre-assembly of the transfer and soft goods item; and the insert having preformed impressions; and
   applying transverse pressure onto the pre-assembly, whereby the soft goods product is produced, with the base layer and thus the raised embellishment layer substantially permanently secured at the desired location.

2. The method according to claim 1, wherein said placing of the insert having compressible properties over the entirety of the embellishment layer include providing the compressible properties of the insert in order to accommodate the depth of the embellishment layer.

3. The method according to claim 2, wherein said placing employs a foam pad as the insert.

4. The method of claim 1, wherein the embellishment layer is printed.

5. The method of claim 1, wherein the embellishment layer is woven.

6. The method of claim 1, wherein the embellishment layer is embroidered.

7. The method of claim 1, wherein the embellishment layer is textured.

8. The method according to claim 1, wherein the raised embellishment is selected from the group consisting of numerical indicia, alphabetical indicia, alphanumeric indicia, a company logo, a trademark logo, a company insignia, a governmental body insignia, an organization insignia, a trademark, a trademark logo, a panel, and combinations thereof.

9. The method according to claim 1, wherein said applying applies a layer of pressure-sensitive adhesive.

10. The method according to claim 1, wherein said applying applies a layer of acrylic adhesive.

11. The method according to claim 1, wherein said applying applies a layer of hot melt adhesive.

12. The method according to claim 1, wherein said applying applies a layer of hot melt pressure-sensitive adhesive.

13. The method according to claim 1, wherein said placing of the insert employs an insert having an outside section with a deformable depth that accommodates the raised embellishment layer without significantly reducing the predetermined height of the raised embellishment layer.

14. The method according to claim 1, wherein said placing employs an insert having an outside section with a deformable depth that is at least about 5% greater than the raised embellishment layer predetermined amount, or between about 5 and 200%, or between about 5 and 100%, or between about 8 and 90%, or between about 9 and 80%, or between about 10 and 70%, or between about 10 and 60%, or between about 10 and 50% greater than the height of the raised embellishment layer.

15. The method according to claim 1, wherein said providing of the soft goods item is provided that is selected from the group consisting of clothing, upper bodywear, lower bodywear, headwear, footwear, outerwear, underwear, garments, sheet goods, banners, flags, athletic or sport uniforms, government uniforms, organization uniforms, and combinations thereof.

16. The method according to claim 1, wherein the manufacturing is carried out in the absence of sewing of the transfer onto the soft goods item.

17. The method according to claim 1, wherein said applying of transverse pressure imparts compressive force to all outside surfaces of the raised embellishment layer.

18. The method according to claim 1, wherein said applying of transverse pressure imparts compressive force to all outside surfaces of the lateral area of the transfer.

* * * * *